United States Patent [19]

Tensor

[11] Patent Number: 5,700,017
[45] Date of Patent: Dec. 23, 1997

[54] FLANGED RUBBER COMBUSTION SEAL

[75] Inventor: Paul M. Tensor, Lombard, Ill.

[73] Assignee: Dana Corporation, Toledo, Ohio

[21] Appl. No.: 721,605

[22] Filed: Sep. 26, 1996

[51] Int. Cl.[6] .................................................. F16J 15/10
[52] U.S. Cl. ............................................... 277/235 B
[58] Field of Search ............................. 277/180, 235 B, 277/211

[56] References Cited

U.S. PATENT DOCUMENTS

| 3,355,181 | 11/1967 | Olson | 277/180 |
|---|---|---|---|
| 3,531,133 | 9/1970 | Sheesley et al. | 277/180 |
| 3,726,178 | 4/1973 | Dimitry. | |
| 4,103,913 | 8/1978 | McDowell. | |
| 4,294,477 | 10/1981 | Ahlstone | 277/180 |
| 4,635,949 | 1/1987 | Lucas et al.. | |
| 4,973,067 | 11/1990 | Fritz | 277/180 |
| 5,228,702 | 7/1993 | Browne et al. | 277/180 |
| 5,267,740 | 12/1993 | Stritzke. | |
| 5,295,698 | 3/1994 | Agarwal et al.. | |
| 5,341,779 | 8/1994 | Chen et al.. | |
| 5,413,359 | 5/1995 | Latty | 277/180 |

FOREIGN PATENT DOCUMENTS

| 499551 | 8/1992 | European Pat. Off. | 277/235 B |
|---|---|---|---|
| 2685943 | 7/1993 | France | 277/235 B |
| 2816383 | 10/1979 | Germany | 277/235 B |
| 2831217 | 1/1980 | Germany | 277/235 B |

*Primary Examiner*—Scott Cummings
*Attorney, Agent, or Firm*—Rader, Fishman and Grauer

[57] ABSTRACT

An annular elastomeric combustion seal for a cylinder head gasket of an internal combustion engine includes a radially inner sealing section and a radially outer section. A first integral cantilevered section is disposed between the inner sealing section and the outer sealing section while a second integral cantilevered section extends radially outwardly from the outer section and is bonded to an inner peripheral edge of the base plate. The seal includes a plurality of grooves with roots, the roots formed by means of the cantilevered sections. Once the gasket is installed, the grooves are substantially diminished, but the seal maintains its natural recovery characteristics. A generally U-shaped flange encloses substantially all of the inner sealing section.

16 Claims, 2 Drawing Sheets

FLANGED RUBBER COMBUSTION SEAL

FIELD OF THE INVENTION

The present invention relates to a cylinder head gasket for an internal combustion engine. More particularly, the invention relates to a gasket having a combustion seal formed from two interconnected sections of high temperature resistant elastomeric material, wherein the radially inner section is optionally enclosed in a generally U-shaped metal flange.

BACKGROUND OF THE INVENTION

Gaskets are often used as a seal between mating mechanical components. One common application involves gasket placement between the engine block and cylinder head of an internal combustion engine. Cylinder head gaskets typically extend around cylinder bores to provide a combustion seal, maintaining the high temperature gases of combustion within the cylinder bores. Simultaneously, the gaskets also seal fluid flow openings such as coolant and oil openings to prevent undesirable mixing. A cylinder head gasket bears the load from a bolted connection of the mechanical components and relies upon that load to provide both the combustion and fluid flow seals.

Known gaskets use several types of combustion seal rings. One type of ring, known as a yieldable combustion seal ring, is essentially comprised of a wire having a generally circular cross-sectional area. The wire may be enclosed within a metallic generally U-shaped flange with opposing legs engaging opposite faces of a main gasket body. A clamping force applied to such a ring is concentrated at the point of contact, deforming the ring's circumference to seal out combustion gases. However, a yieldable combustion seal ring is subject to thermal crushing which produces undesirable additional plastic deformation which may compromise sealing performance.

Other known gaskets utilize continuous sealing beads which surround a combustion opening. The sealing beads are integrally formed into the main gasket body. As with the yieldable combustion seal ring, a clamping force applied to such a ring is concentrated at the point of contact to seal out combustion gases. However, the clamping load required to seal out combustion gases tends to promote undesirable gasket distortion.

SUMMARY OF THE INVENTION

The present invention is directed to a cylinder head gasket of an internal combustion engine having at least one cylinder bore opening and one fluid flow opening. The gasket is clamped between a cylinder head and an engine block. The cylinder head gasket includes at least one rigid base plate with an inner peripheral edge defining a portion of the cylinder bore opening, an annular elastomeric combustion seal, and an annular elastomeric fluid flow seal.

The elastomeric combustion seal has a radially inner sealing section and a radially outer sealing section. A first integral cantilevered section is disposed between the inner sealing section and the outer sealing section. A second integral cantilevered section extends radially outward from the outer sealing section and is adapted to bond with an inner periphery of the cylinder bore opening. A plurality of grooves are formed within the seal. A first opposing pair of grooves is defined between the outer sealing section and the inner sealing section by means of the first cantilevered section while a second opposing pair of grooves is defined between the outer sealing section and the inner peripheral edge of the cylinder bore opening by means of the second cantilevered section.

Preferably, the inner sealing section includes opposing flat faces defining its axial extent in a relaxed orientation with a curved edge extending radially inwardly between the opposing flat faces. The inner sealing section may also include a separately formed generally U-shaped flange enclosing substantially all of the inner sealing section. The flange provides additional rigidity to the seal, additional protection to the elastomeric material and an optional heat sink for the transfer of heat away from the combustion seal to the cylinder head and engine block during engine operation.

The outer sealing section is preferably generally hexagonal with opposing flat faces defining its axial extent in a relaxed orientation. The axial extent of the outer sealing section is greater than that of the inner sealing section.

The fluid flow seal includes a cantilevered section and a single sealing section. The cantilevered section is bonded to an inner peripheral edge of the fluid flow opening. The sealing section is generally hexagonal with opposing flat faces defining its axial extent. The thickness of the sealing section is greater than the thickness of the base plate.

When installed between a cylinder head and an engine block, the seals are compressed to have the same operational thickness as the base plate, substantially diminishing the grooves. By having the grooves present in a relaxed state, however, permanent plastic deformation is reduced. As a result, during a combustion cycle of an internal combustion engine, the seals have superior sealing performance as the various sealing sections adapt to the minute upper movement of the cylinder head through their natural recovery characteristics and in hydraulic response of the elastomeric material to the combustion gas and fluid flow pressure. Further, by having the seals formed primarily from an elastomeric material, the clamping load to provide a desired seal is greatly reduced when compared to more conventional gaskets. Lower clamping loads reduce bore distortion and improve engine performance. Alternatively, the seal can seal higher combustion pressures when compared to conventional gaskets under the same clamping loads.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF A PREFERRED EMBODIMENT

Figure 1:
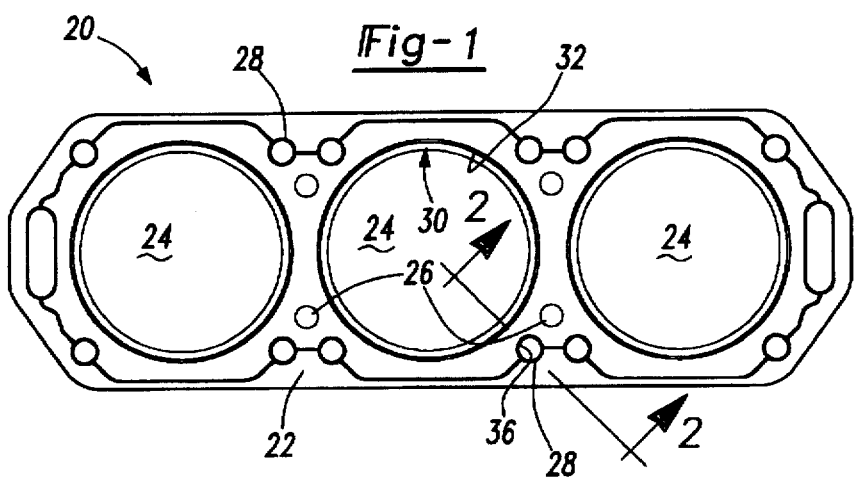
FIG. 1 is a planar view of a gasket incorporating the present invention.
Figure 2:
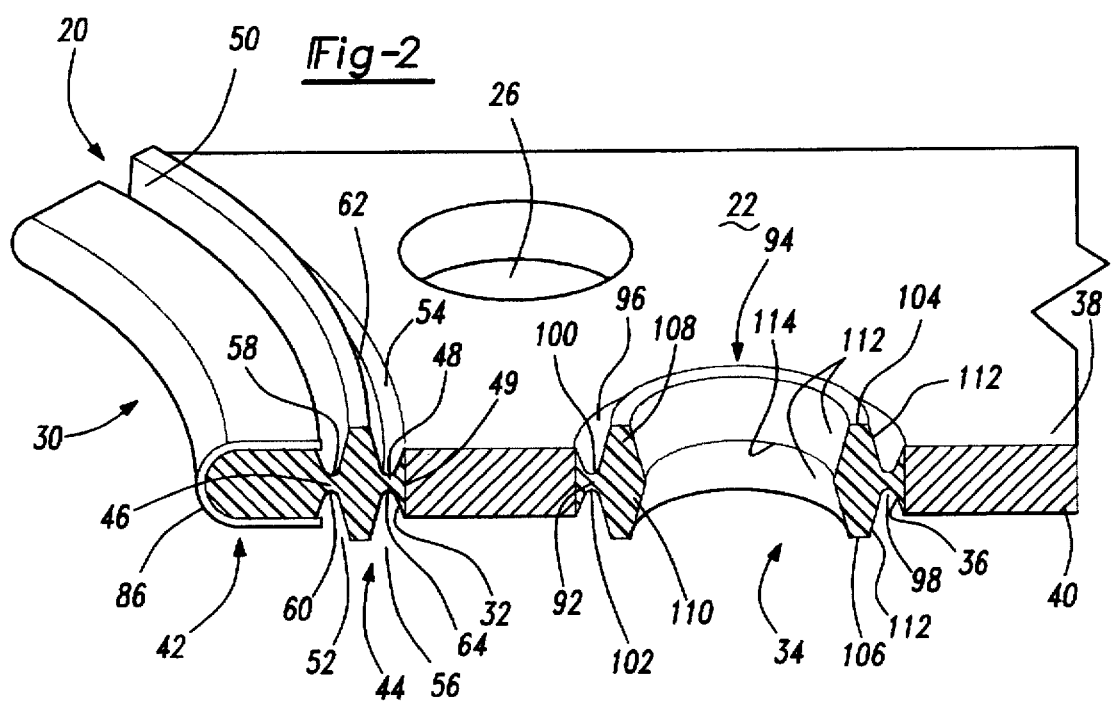
FIG. 2 is a perspective cross-sectional view of the gasket in a relaxed state along lines 2—2 in FIG. 1.
Figure 3:
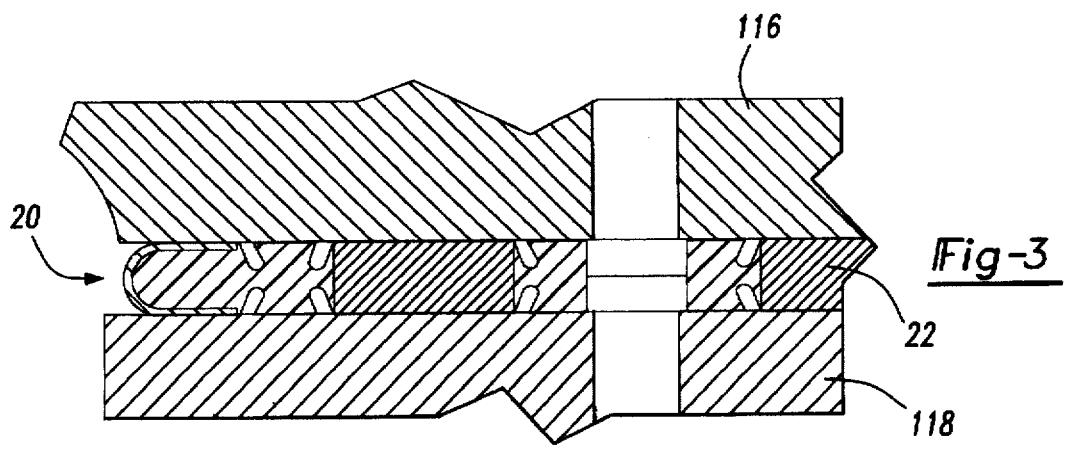
FIG. 3 is an enlarged cross-sectional view of the combustion seal and a portion of the base plate.

A cylinder head gasket 20 is illustrated in a relaxed state in FIGS. 1 through 3. Gasket 20 includes a rigid high temperature plastic or metal base plate 22 having generally annular cylinder bore openings 24, fastener holes 26 and fluid flow openings 28. Preferably, base plate 22 is formed from aluminum. An annular combustion seal 30 comprising high temperature resistant elastomeric material extends about an inner peripheral edge 32 of a bore opening 24 while an elastomeric fluid flow seal 34 extends about an inner peripheral edge 36 of a fluid flow opening 28. A radially extending centerline A—A is equally spaced between opposing faces 38 and 40 of base plate 22 and is equally spaced between upper and lower extremes of each seal.

Combustion seal 30 includes a radially inner sealing section 42, a radially outer sealing section 44, a first integral cantilevered section 46 disposed between inner sealing section 42 and outer sealing section 44, and a second integral cantilevered section 48 extending radially outwardly from outer sealing section 44 and engaging inner peripheral edge 32 of base plate 22. Preferably, section 48 is bonded to edge 32 at a radially outer edge 49 which extends the complete axial extent of base plate 22 between faces 38 and 40. In one preferred embodiment, seal 30 is molded in place to promote the bonding between section 48 and base plate 22.

Seal 30 also includes a plurality of grooves 50, 52, 54, and 56, each of which includes a corresponding convex root 58, 60, 62, and 64. A first opposing pair of grooves 50,52 is formed between inner sealing section 42 and outer sealing section 44 by means of first cantilevered section 46 while a second opposing pair of annular grooves 54,56 is formed between outer sealing section 44 and inner peripheral edge 32 by means of second cantilevered section 48.

The thickness of seal 30 is minimized between roots 58 and 60 of the first cantilevered section 46 and between roots 62 and 64 of second cantilevered section 48. As illustrated in FIG. 3, inner sealing section 42 has a first thickness $t_1$, outer sealing section 44 has a second thickness $t_2$, and base plate 22 has a third thickness $t_3$. Preferably $t_1$ is greater than $t_3$ while $t_2$ is greater than $t_1$ to provide improved sealing as discussed below.

Besides having the largest axial thickness in a relaxed state, outer sealing section 44 is preferably generally hexagonal with opposing flat faces 66 and 68 defining the axial extent of section 44. More particularly, outer sealing section 44 has generally trapezoidal upper and lower portions 70 and 72 with radial walls 74 angled such that a maximum amount of material is disposed about centerline A—A. Radial walls 74 approach centerline A—A at generally equal angles.

While not as thick as outer sealing section 44, inner sealing section 42 includes opposing upper and lower flat faces 74 and 76 defining the axial extent of the section. A curved edge 78 extends radially inwardly between faces 74 and 76. Inner section 42 includes upper and lower portions 80 and 82, each portion having a radially outer wall 84 angled such that a maximum amount of material is disposed about centerline A—A. Radially outer walls 84 approach centerline A—A at generally equal angles.

Combustion seal 30 preferably includes a separately formed generally U-shaped metallic flange 86 which encloses substantially all of inner sealing section 42. An upper leg 88 of flange 86 engages face 74 while a lower leg 90 engages face 76. Flange 86 provides physical protection to the elastomeric material, additional rigidity to the seal, and acts as a heat sink for the transfer of heat away from the combustion seal to the mating components such as a cylinder head and an engine block as illustrated in FIG. 3 and discussed further below.

Fluid flow seal 34 includes a cantilevered section 92 and a single sealing section 94. Cantilevered section 92 is similar to section 48 and sealing section 94 is similar to sealing section 44. In particular, cantilevered section 92 is bonded to inner peripheral edge 36 along the entire axial extent of base plate 22 between faces 38 and 40. Cantilevered section 92 and sealing section 94 define a pair of opposing grooves 96 and 98 with convex roots 100 and 102. Section 94 is generally hexagonal with opposing flat faces 104 and 106 defining the axial extent of section 94. Section 94 has generally trapezoidal upper and lower portions 108 and 110 with radial walls 112 angled such that a maximum amount of material is disposed about centerline A—A with a line of material 114 defining the radial innermost extent of seal 34.

Figure 4:
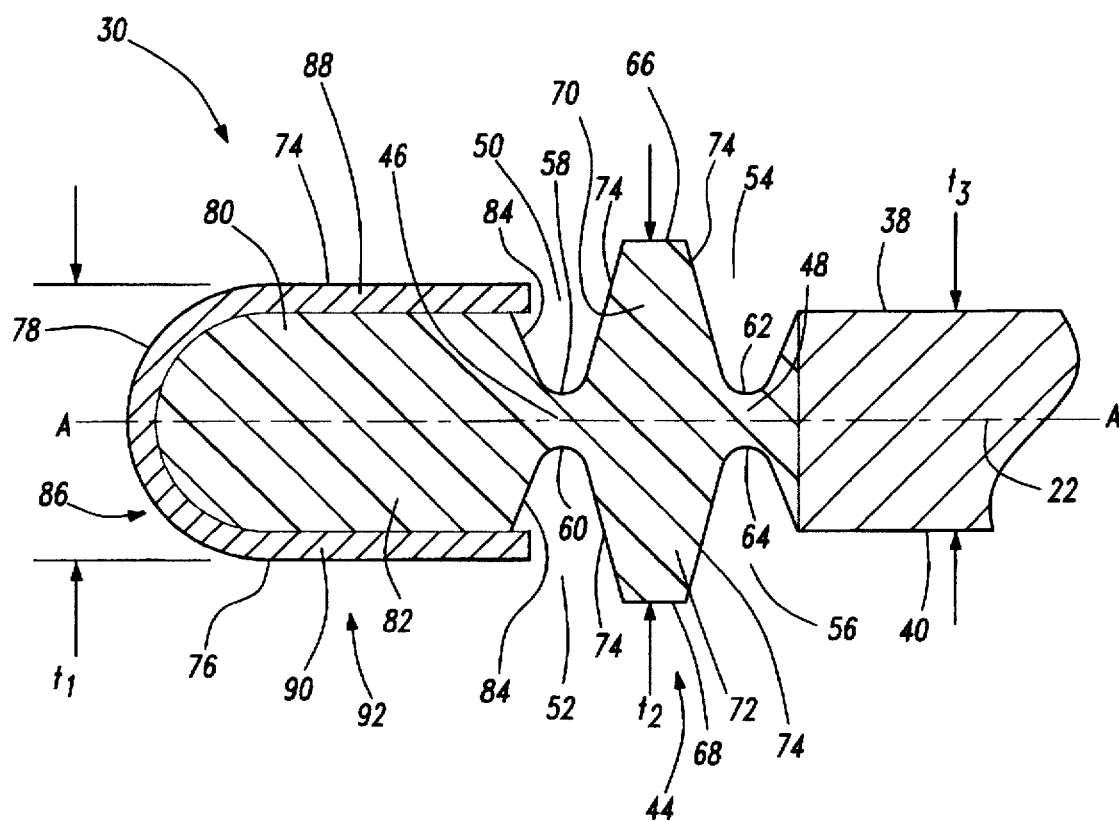
FIG. 4 is a cross-sectional cross sectional view of the gasket of the present invention installed between a cylinder head and engine block.

Gasket 20 is shown installed between a cylinder head 116 and an engine block 118 in FIG. 4. Inner sealing section 42 and outer sealing section 44 are compressed to have the same operational thickness as base plate 22. Base plate 22 provides radial strength and constant operating thickness for seal 30 under the clamping load of the cylinder head bolts. Once installed, inner sealing section 42 pushes against outer sealing section 44, which is under even greater compression because of its increased thickness in a relaxed state compared with inner sealing section 42, and substantially fills the volume between inner peripheral edge 32 and curved edge 78. Grooves 54, 56, 58, and 60 are substantially diminished. Similarly, grooves 96 and 98 of seal 34 are substantially diminished. The process is promoted by having a maximum amount of material disposed about centerline A—A as discussed above. Preferably, the grooves essentially disappear. However, by having them present when gasket 20 is in a relaxed state, the possibility of undesirable permanent plastic deformation is greatly reduced. As a result, during a combustion cycle the minute upper movement of cylinder head 116 is followed by sections 42 and 44 of seal 30 and by section 94 of seal 34 through their natural recovery characteristics and in hydraulic response of the elastomeric material to the combustion gas or fluid flow pressure.

A preferred elastomeric material for seal 30 is high temperature rubber. However, even if a high temperature rubber is used, the presence of flange 86 is also preferred. Flange 86 provides additional radial strength and protection against the high temperature combustion gases. In practice, inner seal section 42 acts as a primary seal to provide constant dynamic surface contact between cylinder head 116 and engine block 118. Inner seal section 42 acts as a flame barrier for outer seal section 44 by blocking the gases of combustion and dissipating heat to the mating surfaces of head 116 and block 118. Any gas that penetrates across the primary seal is contained by the high sealability of outer seal section 44 which acts as secondary seal.

By having combustion and fluid flow seals 30 and 34 formed primarily from an elastomeric material, the clamping load required to provide an adequate seal is greatly reduced when compared to more conventional cylinder head gaskets having flanged composite openings. Lower clamping loads reduce bore distortion and improve engine performance. Gasket 20 can seal higher combustion pressures when compared to conventional gaskets under the same clamping load.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed:

1. An annular elastomeric combustion seal comprising:
    a radially innermost sealing section having a first axial thickness;

a radially outer sealing section contiguous with said radially innermost sealing section having a second axial thickness, said second thickness greater than said first thickness;

a first integral cantilevered section disposed between said inner sealing section and said outer sealing section;

a second integral cantilevered section extending radially outwardly from said outer sealing section; and a plurality of grooves with roots, a first opposing pair of grooves formed between said outer sealing section and said inner sealing section by means of said first cantilevered section, and a second opposing pair of annular grooves formed between said outer sealing section and an outer radial edge of said second cantilevered section.

2. A combustion seal as recited in claim 2, wherein the thickness of said seal is minimized between said roots of each opposing pair of grooves.

3. A combustion seal as recited in claim 1, wherein said outer sealing section is generally hexagonal with opposing flat faces defining the axial extent of said outer sealing section.

4. A combustion seal as recited in claim 3, wherein said outer sealing section has generally trapezoidal upper and lower portions with radial walls of said outer sealing section angled such that a maximum amount of material is disposed about a radially extending centerline A—A of said outer sealing section.

5. A combustion seal as recited in claim 1, wherein said inner sealing section has opposing flat faces defining the axial extent of said inner sealing section, and a curved edge extending radially inwardly between said opposing flat faces.

6. A combustion seal as recited in claim 1, wherein radially outer walls of said inner sealing section are angled such that a maximum amount of material is disposed about a radially extending centerline of said inner sealing section.

7. A combustion seal as recited in claim 1, wherein said inner sealing section includes a separately formed generally U-shaped flange enclosing substantially all of said inner sealing section.

8. An annular elastomeric combustion seal with a radially extending centerline equally spaced between upper and lower extremes of said seal, said seal comprising:

a radially innermost sealing section having opposing flat faces defining the axial extent of said inner sealing section, and a curved edge extending radially inwardly between said opposing flat faces;

a radially outer sealing section which is hexagonal with opposing flat faces defining the axial extent of said outer sealing section;

a first integral cantilevered section disposed between said inner sealing section and said outer sealing section;

a second integral cantilevered section extending radially outwardly from said outer sealing section;

a plurality of grooves with roots, a first opposing pair of grooves formed between said outer sealing section and said inner sealing section by means of said first cantilevered section and a second opposing pair of annular grooves formed between said outer sealing section and an outer radial edge of said second cantilevered section, wherein the thickness of said seal is minimized between said roots of each opposing pair of grooves; and a separately formed generally U-shaped flange enclosing only said innermost sealing section.

9. A combustion seal as recited in claim 8, wherein said inner sealing section has a first thickness and said outer sealing section has a second thickness, said second thickness being greater than said first thickness.

10. A combustion seal as recited in claim 9, wherein said outer sealing section has generally trapezoidal upper and lower portions with radial walls of said outer sealing section angled such that a maximum amount of material is disposed about said centerline A—A, and wherein radially outer walls of said inner sealing section are angled such that a maximum amount of material is disposed about said centerline.

11. A cylinder head gasket of an internal combustion engine having at least one cylinder bore opening, the cylinder head gasket comprising:

at least one rigid base plate with an inner peripheral edge defining a portion of the cylinder bore opening;

an annular elastomeric combustion seal including a radially innermost sealing section having a first thickness in a relaxed state, a radially outer sealing section contiguous with said radially innermost sealing section having a second thickness in a relaxed state, said second thickness being greater than said first thickness, a first integral cantilevered section disposed between said inner sealing section and said outer sealing section, a second integral cantilevered section extending radially outwardly from said outer sealing section and bonded to said inner peripheral edge of said base plate, and a plurality of grooves with roots, a first opposing pair of grooves formed between said outer sealing section and said inner sealing section by means of said first cantilevered section, and a second opposing pair of annular grooves formed between said outer sealing section and said inner peripheral edge by means of said second cantilevered section.

12. A cylinder head gasket as recited in claim 11, wherein said inner sealing section includes a separately formed generally U-shaped flange enclosing substantially all of said inner sealing section.

13. A cylinder head gasket as recited in claim 11, wherein said outer sealing section is generally hexagonal with opposing flat faces defining the axial extent of said outer sealing section and having generally trapezoidal upper and lower portions, and wherein said inner sealing section has opposing flat faces defining the axial extent of said inner sealing section and a curved edge extending radially inwardly which is defined between said opposing flat faces.

14. A cylinder head gasket as recited in claim 11, wherein said base plate has opposing faces and a radially outer edge of said second cantilevered section is bonded along said inner peripheral edge of said base plate between said opposing faces.

15. A cylinder head gasket as recited in claim 11, wherein said base plate has a third thickness, said first thickness being greater than said third thickness.

16. A cylinder head gasket of an internal combustion engine having at least one cylinder bore opening, the cylinder head gasket comprising:

at least one rigid base plate with an inner peripheral edge defining a portion of the cylinder bore opening, said base plate having opposing faces defining the axial extent of said base plate;

an annular elastomeric combustion seal including a radially innermost sealing section with opposing flat faces defining the axial extent of said inner sealing section and a curved edge extending radially inwardly which is defined between said opposing flat faces, a radially outer sealing section which is generally hexagonal with opposing flat faces defining the axial extent of said outer sealing section and having generally trapezoidal upper and lower portions, a first integral cantilevered section extending radially outwardly from said outer sealing section and bonded to said inner peripheral edge of said base plate between said opposing faces, and a plurality of grooves with roots, a first opposing pair of grooves formed between said outer sealing section and said inner sealing section by means of said first cantilevered section, and a second opposing pair of annular grooves formed between said outer sealing section and said inner peripheral edge by means of said second cantilevered section; and a separately formed generally U-shaped flange enclosing only said innermost sealing section, wherein said inner sealing section has a first thickness in a relaxed state, said second thickness being greater than said first thickness, and wherein said base plate has a third thickness, said first thickness being greater than said third thickness.

* * * * *

UNITED STATES PATENT AND TRADEMARK OFFICE
CERTIFICATE OF CORRECTION

PATENT NO : 5,700,017

DATED : December 23, 1997

INVENTOR(S) : Paul M. Tensor

It is certified that error appears in the above-identified patent and that said Letters Patent is hereby corrected as shown below:

Col. 5, line 15
 replace "2"
 with --1--.

Signed and Sealed this

Nineteenth Day of May, 1998

Attest:

BRUCE LEHMAN

Attesting Officer

*Commissioner of Patents and Trademarks*